(12) United States Patent
Ho et al.

(10) Patent No.: US 12,001,568 B2
(45) Date of Patent: Jun. 4, 2024

(54) ENCRYPTION METHOD AND ENCRYPTION SYSTEM

(71) Applicant: AI Bioelectronic Healthtech Co., Ltd., Taoyuan (TW)

(72) Inventors: Yen-Yi Ho, Taoyuan (TW); Huei-Yun Gong, New Taipei (TW); Yen-Yun Huang, New Taipei (TW)

(73) Assignee: AI Bioelectronic Healthtech Co., Ltd., Taoyuan (TW)

( * ) Notice: Subject to any disclaimer, the term of this patent is extended or adjusted under 35 U.S.C. 154(b) by 338 days.

(21) Appl. No.: 17/528,382

(22) Filed: Nov. 17, 2021

(65) Prior Publication Data
US 2022/0350897 A1    Nov. 3, 2022

(30) Foreign Application Priority Data

May 3, 2021 (TW) ................................ 110115897

(51) Int. Cl.
*G06F 21/60* (2013.01)
*G06F 21/62* (2013.01)
*G06F 21/78* (2013.01)
*G06F 21/10* (2013.01)

(52) U.S. Cl.
CPC ........ *G06F 21/602* (2013.01); *G06F 21/6209* (2013.01); *G06F 21/78* (2013.01); *G06F 21/107* (2023.08)

(58) Field of Classification Search
CPC .... G06F 21/602; G06F 21/6209; G06F 21/78; G06F 21/107; G06F 21/6245; H04L 9/06; H04L 9/50; H04L 9/14
See application file for complete search history.

(56) References Cited

U.S. PATENT DOCUMENTS

| | | | |
|---|---|---|---|
| 8,504,826 B2 * | 8/2013 | Lin | H04L 9/3271 713/161 |
| 9,749,132 B1 * | 8/2017 | Hamilton | H04L 9/14 |
| 2005/0172140 A1 * | 8/2005 | Ide | G06F 21/62 713/188 |
| 2012/0069992 A1 * | 3/2012 | Jozwiak | G06F 21/16 380/28 |
| 2012/0131336 A1 * | 5/2012 | Price | G06F 21/78 713/165 |

(Continued)

FOREIGN PATENT DOCUMENTS

| | | |
|---|---|---|
| TW | 201218726 A1 | 5/2012 |
| WO | WO2005034425 A1 | 4/2005 |

*Primary Examiner* — J. Brant Murphy
(74) *Attorney, Agent, or Firm* — Best & Flanagan LLP

(57) ABSTRACT

An encryption method applied to an encryption system is disclosed. The encryption system includes a transmission module, an encryption module and a memory. The memory contains n data, where n is an integer and n≥0, and the n data are encrypted by the encryption module. The multiple encryption method includes: via the transmission module, receiving an encryption request and an n+1$^{th}$ data; storing the n+1$^{th}$ data in the memory; via the encryption module, according to the encryption request, encrypting the n data and the n+1$^{th}$ data to form an encrypted data.

10 Claims, 4 Drawing Sheets

(56) References Cited

U.S. PATENT DOCUMENTS

2017/0099135 A1* 4/2017 Kawase ............. G06F 21/6245
2019/0156069 A1* 5/2019 Heo .................... G06F 21/602
2019/0258991 A1* 8/2019 Nguyen .............. H04L 9/0894
2021/0350017 A1* 11/2021 Gordon ............... G06F 21/602

* cited by examiner

ENCRYPTION METHOD AND ENCRYPTION SYSTEM

BACKGROUND OF THE INVENTION

1. Field of the Invention

The present invention relates to an encryption method and an encryption system; more particularly, the present invention relates to an encryption method and an encryption system which improve information security.

2. Description of the Related Art

Due to technological progress in recent years, a chip with an information recording function can be installed on an object to record data related to the object (such as the object factory information, transportation information, and user information). In addition, in order to prevent information leakage, the manufacturer will also protect the data stored on the chip by using a single encryption method and a single password.

However, a single encryption method and a single password for encryption is relatively simple for a hacker to crack, causing an information security problem. Therefore, there is a need to provide a new encryption method to enhance information security.

SUMMARY OF THE INVENTION

It is an object of the present invention to provide an encryption method which improves information security.

To achieve the abovementioned object, an encryption method of the present invention is applied to an encryption system, wherein the encryption system includes a transmission module, an encryption module and a memory; the memory already has n data stored in it, where n is an integer and n≥0, and the n data are encrypted by the encryption module. The encryption method includes: via the transmission module, receiving an encryption request and an $n+1^{th}$ data; storing the $n+1^{th}$ data in the memory; via the encryption module, according to the encryption request, encrypting the n data and the $n+1^{th}$ data to form an encrypted data.

According to one embodiment of the present invention, the encryption system further includes a decryption module. The encryption method further includes: via the transmission module, receiving a decryption request, wherein the decryption request comprises a decryption key; via the decryption module, determining if the decryption key of the decryption request corresponds to a decryption key of the encrypted data; if so, via the decryption module, decrypting the encrypted data.

According to one embodiment of the present invention, the encryption method further includes: via the transmission module, sending the n data and the $n+1^{th}$ data which are decrypted to an external computer.

According to one embodiment of the present invention, the encryption module uses for encryption at least one of a symmetric cipher, an asymmetric cipher and a hash algorithm.

According to one embodiment of the present invention, the symmetric cipher is at least one of AES, ChaCha20, DES, 3DES, Satsa20, Blowfish, IDEA, RC5, RC6 and Camellia; the asymmetric cipher is at least one of RSA, ElGamal, Rabin, DSA and ECDSA; the hash algorithm is at least one of MD2, MD4, MD5, SHA-0, SHA-1, SHA-2, SHA-3, BLAKE, BLAKE2 and BLAKE3.

The object of the present invention is to provide an encryption system which improves information security.

To achieve the abovementioned object, an encryption system of the present invention includes a transmission module, a memory and an encryption module. The transmission module is used for receiving a data. The memory already contains n data, wherein n is an integer. The encryption module is electrically connected to the transmission module and the memory, wherein the encryption module is used for encrypting the data, and the n data are encrypted by the encryption module. After the transmission module received an encryption request and an $n+1^{th}$ data, the memory will store the $n+1^{th}$ data, and the encryption module will encrypt the n data and the $n+1^{th}$ data according to the encryption request to form an encrypted data.

According to one embodiment of the present invention, the encryption system further includes a decryption module, and the decryption module is electrically connected to the memory. When the transmission module receives a decryption request which comprises a decryption key, the decryption module will determine if the decryption key of the decryption request corresponds to a decryption key of the encrypted data; if so, the decryption module will decrypt the encrypted data.

According to one embodiment of the present invention, the transmission module sends the decrypted n data and $n+1^{th}$ data to an external computer.

According to one embodiment of the present invention, the encryption module uses at least one of a symmetric cipher, an asymmetric cipher and a hash algorithm to encrypt data.

DETAILED DESCRIPTION OF THE PREFERRED EMBODIMENTS

Figure 1:
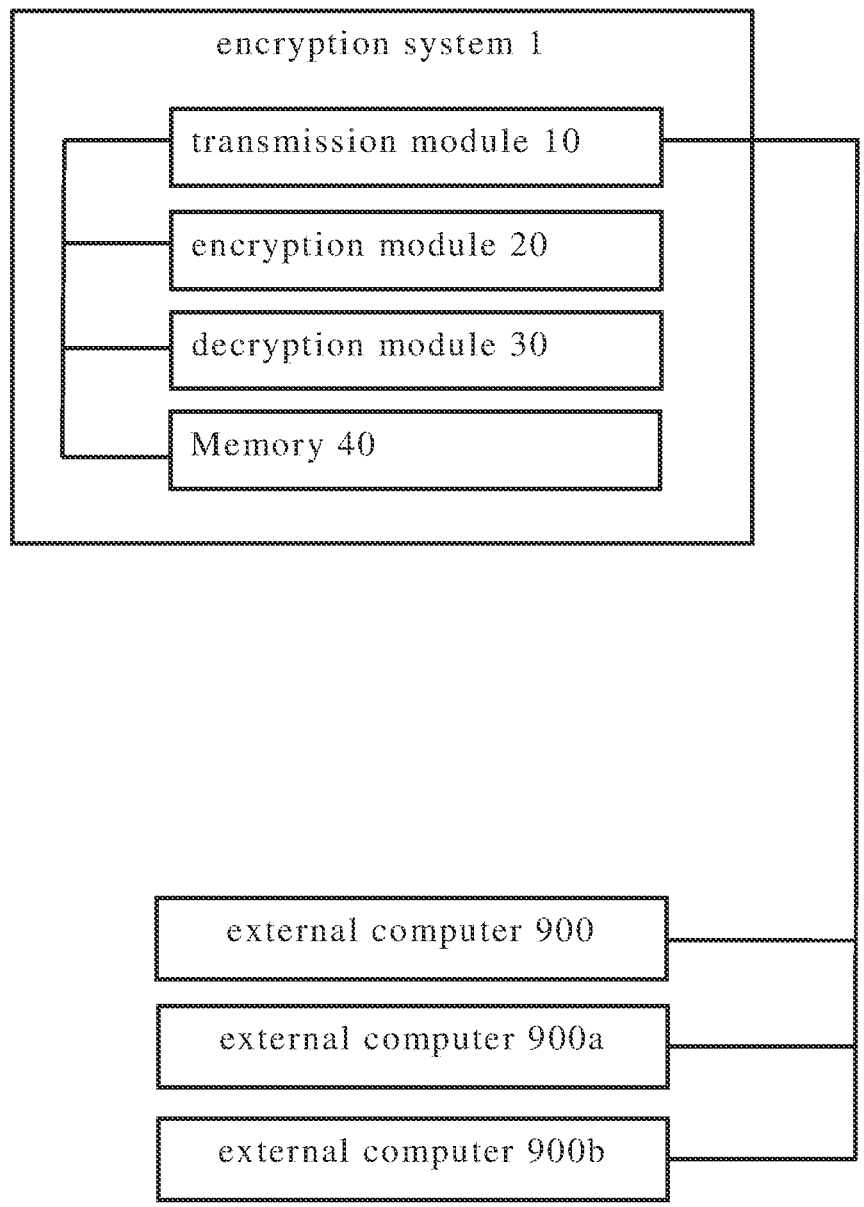
FIG. 1 illustrates a system structure drawing of the encryption system and an external computer in the first embodiment of the present invention.
Figure 2:
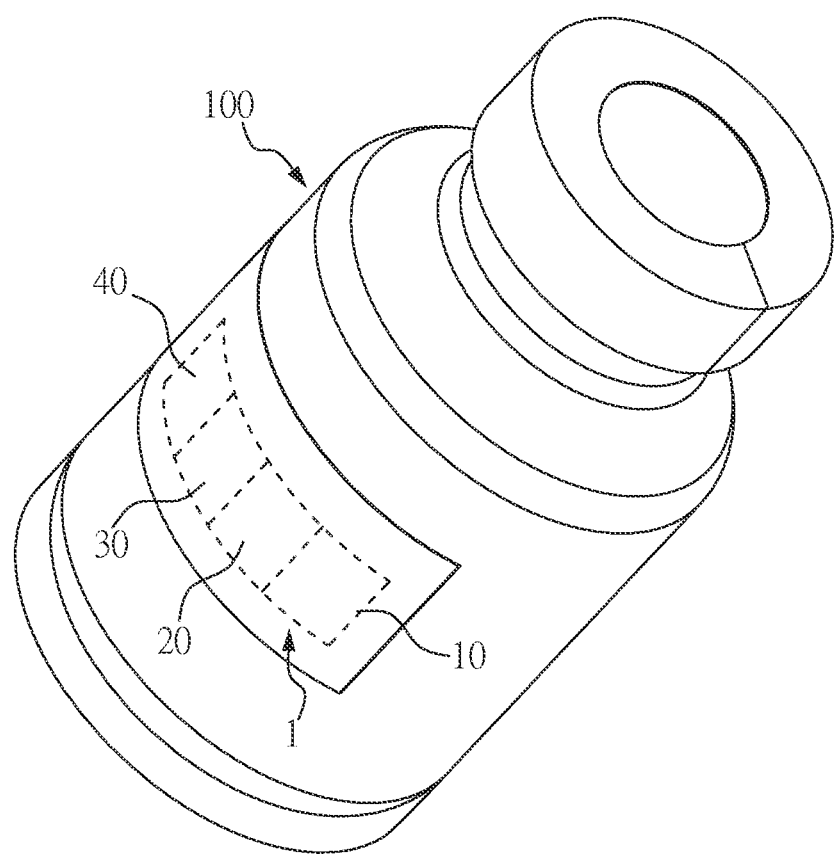
FIG. 2 illustrates a schematic drawing of the object and the encryption system in the first embodiment of the present invention.
Figure 3:
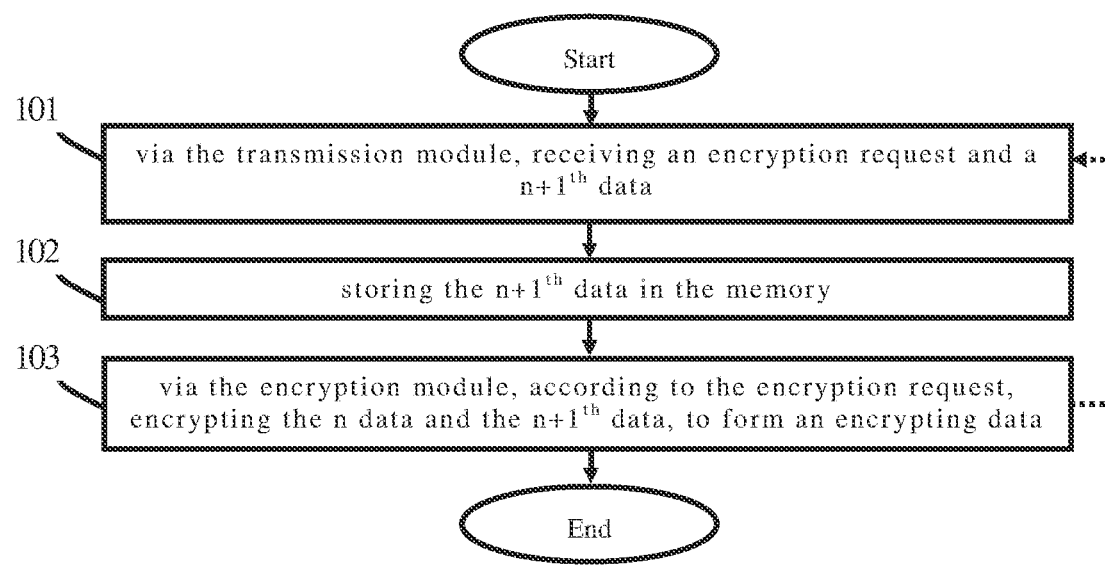
FIG. 3 illustrates a flowchart of the encryption method in the first embodiment of the present invention.

Please refer to FIG. 1 to FIG. 3, which illustrate the encryption system and the encryption method in the first embodiment of the present invention. FIG. 1 illustrates a system structure drawing of the encryption system and an external computer in the first embodiment of the present invention. FIG. 2 illustrates a schematic drawing of the object and the encryption system in the first embodiment of the present invention. FIG. 3 illustrates a flowchart of the encryption method in the first embodiment of the present invention.

In the first embodiment of the present invention, as shown in FIG. 1 and FIG. 2, the encryption system 1 is installed on an object 100. The encryption system 1 can store the data related to the object 100 and the encryption system 1; for example, the encryption system 1 may store the recorded data on the production, logistics and processing of the object 100, and the encryption system 1 can encrypt the data multiple times with a plurality of encryption methods to improve the information security. The encryption system 1 and the external computers 900, 900a, 900b are electrically connected for sending information to each other. The object 100 is a medicine bottle for containing medicine. The external computers 900, 900a, 900b are a desktop computer, a notebook computer, a tablet computer, a mobile phone, or another device with network functionality.

The encryption system 1 includes a transmission module 10, an encryption module 20, a decryption module 30 and a memory 40. The transmission module 10 is a network card for electrically connecting to the external computers 900, 900a, 900b to send data to the devices. The encryption module 20 is a chip or software with an encryption function using at least one of a symmetric cipher, an asymmetric cipher and a hash algorithm to encrypt the data. The type of the symmetric cipher includes at least one of AES, Cha-Cha20, DES, 3DES, Satsa20, Blowfish, IDEA, RC5, RC6, and Camellia. The type of the asymmetric cipher includes at least one of RSA, ElGamal, Rabin, DSA, and ECDSA. The type of the hash algorithm includes at least one of MD2, MD4, MD5, SHA-0, SHA-1, SHA-2, SHA-3, BLAKE, BLAKE2, and BLAKE3. However, the types of the symmetric cipher, the asymmetric cipher and the hash algorithm are not limited to the abovementioned description; the type can be changed according to user requirements. It is to be known that the types of the abovementioned symmetric cipher, asymmetric cipher and hash algorithm are already disclosed in the field of data encryption, and the type of the cryptography is not the focus of this present invention, so there is no need for further description. In addition, the type of cryptography used for each encryption is not limited to one type; for example, if the user uses the encryption module 20 to encrypt a string of data with a length of 50 characters, the encryption module 20 can use AED encryption to encrypt the first half of the data (the first 25 characters) and use RSA encryption to encrypt the second half of the data (the last 25 characters).

The decryption module 30 is a chip or software with a decryption function for decrypting data which are encrypted by the encryption module 20. The memory 40 is electrically connected to the transmission module 10, the encryption module 20 and the decryption module 30. The memory 40 is used for storing data and software for executing the encryption method. The encryption method is programmed as a software and stored in the memory 40. The memory 40 contains n data, wherein n is an integer and n≥0.

In the first embodiment of the present invention, as shown in FIG. 1 to FIG. 3, when the manufacturer makes the object 100, the manufacturer will install the encryption system 1 on the bottle of the object 100, and the manufacturer will use the external computer 900 to send the factory information of the object 100 to the encryption system 1. The encryption module 20 of the encryption system 1 will encrypt the factory information, and the memory 40 will store the factory information. The encrypting factory information is the n data, and n is 1; for the convenience of reading, in the following description, the factory information of the n data will be described as the first data. The factory information is the name of the medicine contained in the object 100, the composition of the medicine, the date of manufacture, the expiration date, the package insert and the related data of the manufacturer. However, the content of the first data is not limited to the abovementioned description and can be changed according to actual requirements. In the first embodiment, the encryption method used by the encryption module 20 for encrypting the factory information is the symmetric cipher RC6 and the decryption key is the alphanumeric password "ABCDE12345"; therefore, in the subsequent processing, if the factory information needs to be decrypted, the decryption key must comprise the same encryption method and password.

Then the manufacturer can deliver the object 100 to the logistics vendor, and the logistics vendor can use the external computer 900a to send the logistics information and the encryption request of the object 100 to the encryption system 1; at this moment, the encryption system 1 executes Step 101 of the encryption method: via the transmission module, receiving an encryption request and an $n+1^{th}$ data.

The transmission module 10 receives the encryption request and the logistics information of the object 100 sent by the external computer 900a; in the present invention, the logistics information is the $n+1^{th}$ data, and n is 1; for the convenience of reading, in the following description, the logistics information of the $n+1^{th}$ data will be described as the second data. Furthermore, the network card of the transmission module 10 can detect the IP of the external computer 900a and record the iP into the memory 40.

Then the encryption system 1 executes Step 102 of the encryption method: storing the $n+1^{th}$ data in the memory.

The transmission module 10 sends the received second data to the memory 40. The memory 40 stores the second data. The content of the second data is the logistics information of the object 100, such as the transportation date, the transportation route, the transportation method, and the staff responsible for transportation of the object 100.

Then encryption system 1 executes Step 103 of the encryption method: via the encryption module, according to the encryption request, encrypting the n data and the $n+1^{th}$ data to form an encrypted data.

The transmission module 10 sends the received encryption request to the encryption module 20. The encryption module 20 encrypts the first data and the second data stored in the memory 40 according to the encryption request to form an encrypted data. In the present invention, the encryption request can select the encryption method from the set of a symmetric cipher, an asymmetric cipher and a hash algorithm; then from the selected encryption method, the encryption module 20 will randomly select any specific type of encryption to perform the encryption. For example, if the encryption request selects a symmetric cipher, the encryption module 20 will randomly select one of the types of symmetric ciphers (such as RC6) to encrypt the data. Alternatively, the encryption request can also select the encryption method from the abovementioned three types of encryption methods and then select a specific cryptography type from the specified encryption method. Alternatively, the encryption request may not select the encryption method to be used or the specific cryptography type, and the encryption module 20 may randomly select the encryption method and cryptography type. The encryption method and specific cryptography type data used by the encryption module 20 are stored in the memory 40. Due to the mechanism of the encryption module 20 randomly selecting the type of cryptography, it is difficult for a hacker to confirm the type of cryptography to crack, such that the information security is improved. Furthermore, the encryption request includes a decryption key; the content of the encryption request and the decryption key are stored in the memory 40. The decryption key is used for allowing the encryption system 1 to determine if the decryption key corresponds to the decryption request when the encryption system 1 receives a decryption request from the outside; if the decryption key corresponds to the decryption request, the decryption processing will be executed. In the first embodiment, the encryption request uses the asymmetric cipher ECDSA to encrypt the first data and the second data to form an encrypted data; the decryption key of the encryption request is the alphanumeric password "FGHIJ67890"; therefore, in the subsequent processing, if the encrypted data needs to be decrypted, the decryption key must match the same cryptographic method and password.

It is to be known that, because the hash algorithm uses cryptography to shuffle and mix the data and to recreate a random number to encrypt the data, the data which are encrypted by the hash algorithm cannot be decrypted in the following step; thus, the user can consider whether the data will no longer need to be decrypted in the future and choose the hash algorithm to encrypt it.

Via the mechanism of the cryptography type being randomly selected by the encryption module 20, it is difficult for a hacker to confirm the encryption they want to crack, such that the information security is improved. Furthermore, the factory information is encrypted by the encryption module 20 first and stored in the memory 40. Then in Step 103, the factory information is encrypted by the encryption module 20 according to the encryption request, such that the information security of the factory information, which is multiply encrypted, will be further improved.

After the encryption module 20 encrypts the first data (which is the factory information: the n data) and the second data (which is the logistics information: the $n+1^{th}$ data) according to the encryption request, then if the logistics vendor delivers the object 100 to a medical institution for subsequent treatment, the medical institution will use the external computer 900b to deliver the medical information of the object 100 (such as the delivery date, the medical institution, the date of use of the object 100, and the data of the patient who used the medicine) and another encryption request to the encryption system 1; at this moment, Step 101 to Step 103 can be repeated along the dotted line shown in FIG. 3, where n is defined as 2, the second data of the logistics information and the factory information are integrated and defined as the new version of the n data, and the medical information is defined as the new version of the $n+1^{th}$ data (which is the third data). Therefore, after repetition of Step 101 to Step 103, the third data is encrypted according to the encryption request sent by the external computer 900b, and the new version of the second data (which are the factory information and logistics information encrypted by the encryption request) is encrypted again according to the encryption request; this means that the original factory information and logistics information will be multiply encrypted, such that the information security will be further increased.

Figure 4:
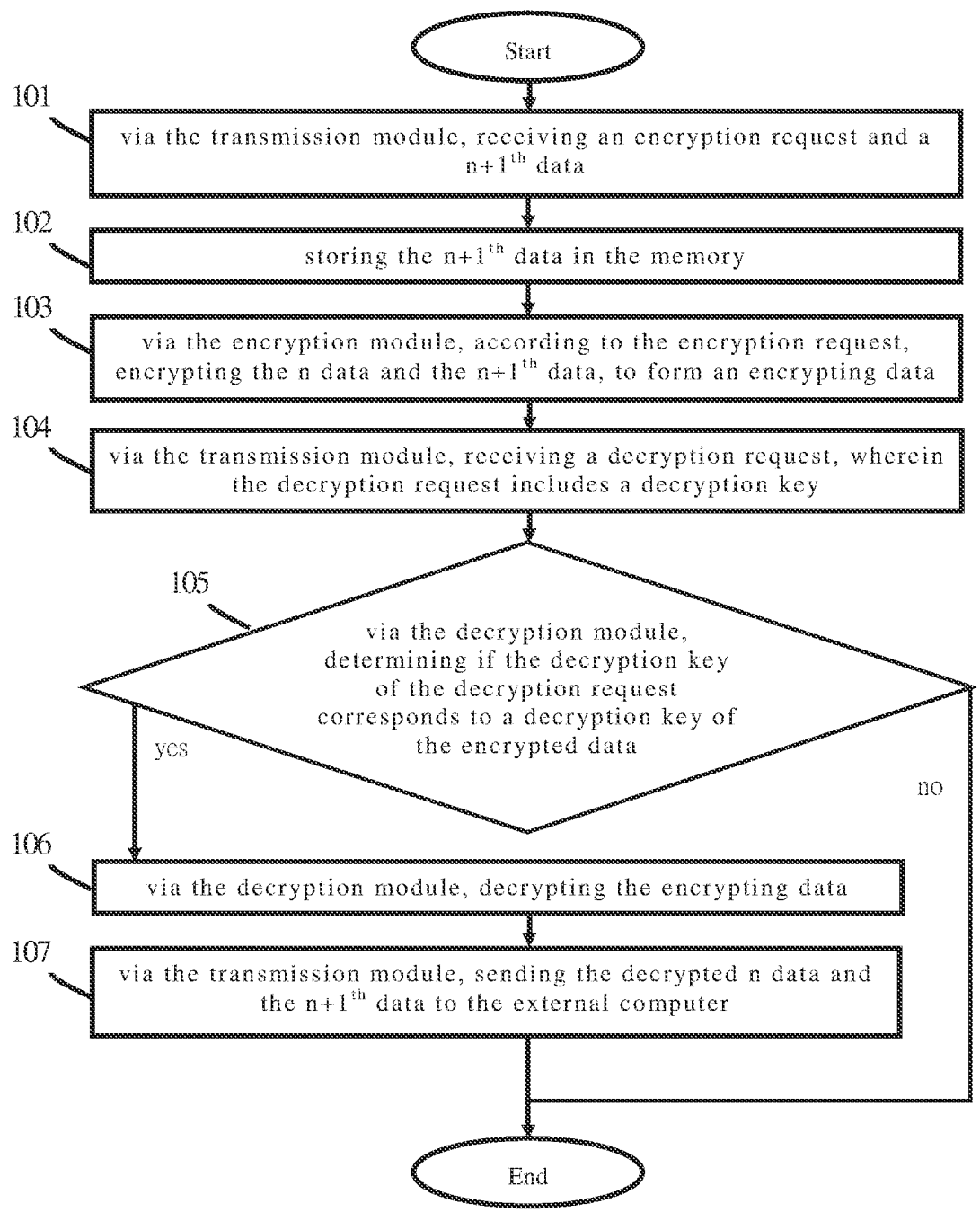
FIG. 4 illustrates a flowchart of the encryption method in the second embodiment of the present invention.

Please refer to FIG. 4, which illustrates the encryption system and the encryption method in the second embodiment of the present invention. FIG. 4 illustrates a flowchart of the encryption method in the second embodiment of the present invention.

As shown in FIG. 4, the difference between the first embodiment and the second embodiment is that, in the encryption method of the second embodiment, after the execution of Step 103, if the manufacturer wants to check the encrypted data recorded in the encryption system 1, the manufacturer can operate the external computer 900 to send a decryption request to the encryption system 1; at this moment, then the encryption system 1 executes Step 104 of the encryption method: via the transmission module, receiving a decryption request, wherein the decryption request includes a decryption key.

The transmission module 10 receives a decryption request send by the external computer 900. The transmission module 10 sends the decryption request to the decryption module 30. The decryption request includes a decryption key and the target data to be decrypted.

Then the encryption system 1 executes Step 105 of the encryption method: via the decryption module, determining if the decryption key of the decryption request corresponds to a decryption key of the encrypted data.

After the decryption module 30 receives the decryption request, the decryption module 30 will read the encryption request and the decryption key thereof stored in the memory 40 and the target data to be decrypted to determine if the decryption key of the decryption request corresponds to the decryption key of the encrypted data. As described above, when the factory information stored in the memory 40 is first encrypted by the encryption module 20, the encryption module 20 will use the symmetric cipher RC6 with the decryption key "ABCDE12345" to encrypt the data; when the encryption module 20 encrypts the first data and the second data, the encryption module 20 will use the asymmetric cipher ECDSA with the decryption key of "FGHIJ67890" to form an encrypted data. Therefore, the decryption module 30 can determine if the decryption key of the decryption request indicates the same cryptography type and the same decryption key. Furthermore, the type of the decryption key is not limited to the abovementioned alphanumeric password, and the decryption key can also be a digital signature. In the present embodiment, the decryption request provides the following information: the decryption target is "factory information", the cryptography type corresponding to the factory information is the symmetric cipher RC6, and the decryption key is "ABCDE12345"; the decryption target is "the encrypted data formed via encrypting the logistics information and the factory information", the cryptography corresponded to the encrypted data is the asymmetric cipher ECDSA, and the decryption key is "FGHIJ67890".

If the decryption key of the decryption request does not correspond to the decryption key of the encrypted data, the encryption method will end. If the decryption key of the decryption request corresponds to the decryption key of the encrypted data, the encryption system 1 will execute Step 106 of the encryption method: via the decryption module, decrypting the encrypted data.

After the decryption module 30 determines that the decryption key of the decryption request corresponds to the decryption key of the encrypted data, the decryption module 30 will read the encrypted data stored in the memory 40 and decrypt the encrypted data which are encrypted by the asymmetric cipher ECDSA to obtain the decrypted second data and first data, which are still encrypted by the symmetric cipher RC6. Then the decryption module 30 will decrypt the first data (which is the factory information) again to obtain the first data, which are completely decrypted; finally, the encrypted data (which are the first data and the second data) will be completely decrypted and sent to the transmission module 10.

Finally, the encryption system 1 executes Step 110 of the encryption method: via the transmission module, sending the decrypted n data and the $n+1^{th}$ data to the external computer.

The transmission module 10 sends the decrypted first data and second data to the external computer 900 according to the IP of the external computer 900 stored in the memory 40, allowing the staff who operate the external computer 900 to read the first data and second data, which are decrypted completely.

Via the encryption system 1 and the encryption method of the present invention, various records of the production, logistics, and use of the object can be stored, and the encryption system can perform multiple encryption steps on different data according to the encryption keys of different sources to further enhance the information security.

What is claimed is:

1. An encryption method, applied to an encryption system, wherein the encryption system is installed on an object, the encryption system stores data related to the object and the encryption system, the encryption system comprises a transmission module, an encryption module and a memory, the memory stores n data, where n is an integer and n≥0 and the n data are encrypted by the encryption module, the encryption method comprising:
    via the transmission module, receiving an encryption request and an $n+1^{th}$ data;
    storing the $n+1^{th}$ data in the memory; and
    via the encryption module, according to the encryption request, encrypting the n data and the $n+1^{th}$ data to form an encrypted data.

2. The encryption method as claimed in claim 1, wherein the encryption system further comprises a decryption module, the encryption method further comprising:
    via the transmission module, receiving a decryption request, wherein the decryption request comprises a decryption key;
    via the decryption module, determining if the decryption key of the decryption request corresponds to a decryption key of the encrypted data;
    if the decryption key of the decryption request corresponds to a decryption key of the encrypted data, via the decryption module, decrypting the encrypted data.

3. The encryption method as claimed in claim 2, further comprising:
    via the transmission module, sending the n data and the $n+1^{th}$ data which are decrypted to an external computer.

4. The encryption method as claimed in claim 1, wherein the encryption module uses at least one of a symmetric cipher, an asymmetric cipher and a hash algorithm to encrypt data.

5. The encryption method as claimed in claim 4, wherein the symmetric cipher is at least one of AES, ChaCha20, DES, 3DES, Satsa20, Blowfish, IDEA, RC5, RC6 and Camellia; the asymmetric cipher is at least one of RSA, ElGamal, Rabin, DSA and ECDSA; the hash algorithm is at least one of MD2, MD4, MD5, SHA-0, SHA-1, SHA-2, SHA-3, BLAKE, BLAKE2 and BLAKE3.

6. An encryption system, installed on an object, wherein the encryption system stores data related to the object and the encryption system, the encryption system comprising:
    a transmission module, for receiving a data;
    a memory, storing n data, wherein n is an integer; and
    an encryption module, electrically connected to the transmission module and the memory, wherein the encryption module is used for encrypting the data, and the n data are encrypted by the encryption module;
    wherein after the transmission module receives an encryption request and an $n+1^{th}$ data, the memory will store the $n+1^{th}$ data, and the encryption module will encrypt the n data and the $n+1^{th}$ data according to the encryption request to form an encrypted data.

7. The encryption system as claimed in claim 6, further comprising a decryption module, wherein the decryption module is electrically connected to the memory; when the transmission module receives a decryption request which comprises a decryption key, the decryption module will determine if the decryption key of the decryption request corresponds to a decryption key of the encrypted data; if the decryption key of the decryption request corresponds to a decryption key of the encrypted data, the decryption module decrypts the encrypted data.

8. The encryption system as claimed in claim 7, wherein the transmission module sends the decrypted n data and the $n+1^{th}$ data to an external computer.

9. The encryption system as claimed in claim 6, wherein the encryption module uses at least one of a symmetric cipher, an asymmetric cipher and a hash algorithm to encrypt data.

10. The encryption system as claimed in claim 9, wherein the symmetric cipher is at least one of AES, ChaCha20, DES, 3DES, Satsa20, Blowfish, IDEA, RC5, RC6 and Camellia; the asymmetric cipher is at least one of RSA, ElGamal, Rabin, DSA and ECDSA; the hash algorithm is at least one of MD2, MD4, MD5, SHA-0, SHA-1, SHA-2, SHA-3, BLAKE, BLAKE2 and BLAKE3.

* * * * *